United States Patent
Lemmers, Jr.

(10) Patent No.: US 10,495,186 B2
(45) Date of Patent: Dec. 3, 2019

(54) LOW SPEED SPOOL GENERATOR TRANSMISSION

(71) Applicant: Hamilton Sundstrand Corporation, Charlotte, NC (US)

(72) Inventor: Glenn C. Lemmers, Jr., Loves Park, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 316 days.

(21) Appl. No.: 15/411,069

(22) Filed: Jan. 20, 2017

(65) Prior Publication Data

US 2018/0209513 A1 Jul. 26, 2018

(51) Int. Cl.
*F16H 3/66* (2006.01)
*F01D 15/00* (2006.01)
*F02C 7/36* (2006.01)
*F16D 7/00* (2006.01)

(52) U.S. Cl.
CPC .............. *F16H 3/66* (2013.01); *F01D 15/00* (2013.01); *F02C 7/36* (2013.01); *F05D 2260/40311* (2013.01); *F16D 7/00* (2013.01); *F16H 2200/0039* (2013.01); *F16H 2200/2007* (2013.01); *F16H 2200/2038* (2013.01); *F16H 2200/2041* (2013.01); *F16H 2200/2066* (2013.01); *F16H 2200/2069* (2013.01); *F16H 2200/2082* (2013.01); *F16H 2200/2084* (2013.01)

(58) Field of Classification Search
None
See application file for complete search history.

(56) References Cited

U.S. PATENT DOCUMENTS

| 3,463,180 | A | * | 8/1969 | Yamada | F16H 3/66 137/269 |
| 3,895,542 | A | * | 7/1975 | Miyauchi | F16H 3/66 477/158 |
| 4,665,770 | A | * | 5/1987 | Van Selous | F16H 3/66 192/3.31 |
| 8,304,927 | B2 | | 11/2012 | Cote et al. | |

(Continued)

FOREIGN PATENT DOCUMENTS

DE 102014216984 A1 3/2016
EP 2644867 A2 * 10/2013 ............... F02C 7/32

OTHER PUBLICATIONS

Extended European Search Report, of the European Patent Office, dated May 28, 2018, issued in corresponding European Patent Application No. 18152620.3.

*Primary Examiner* — Justin Holmes
(74) *Attorney, Agent, or Firm* — Locke Lord LLP; Daniel J. Fiorello; Joshua L. Jones (57) ABSTRACT

A low speed spool multispeed transmission includes an input shaft configured to connect to a low pressure spool gearbox, a gear system connected to the input shaft and configured to convert an input speed of the input shaft to an output speed within a predetermined speed range, wherein the gear system includes a plurality of gear states to change the ratio between the input speed and the output speed, and an output shaft connected to the gear system to be rotated by the gear system at the output speed, the output shaft configured to connect to a generator. The input shaft and the output shaft can be coaxial.

14 Claims, 6 Drawing Sheets

(56) References Cited

U.S. PATENT DOCUMENTS

| | | | |
|---|---|---|---|
| 2006/0272313 A1* | 12/2006 | Eick | F02C 3/107 60/39.63 |
| 2012/0221157 A1* | 8/2012 | Finney | G06F 1/26 700/287 |
| 2013/0232941 A1 | 9/2013 | Huang | |
| 2013/0267378 A1* | 10/2013 | Hiraiwa | B60W 20/00 477/5 |
| 2014/0150401 A1 | 6/2014 | Venter | |
| 2014/0338352 A1 | 11/2014 | Edwards et al. | |
| 2016/0130970 A1 | 5/2016 | Blazer et al. | |

\* cited by examiner

| Actual Gear Ratios | |
|---|---|
| 1st Gear | 3.6000 |
| 2nd Gear | 1.9941 |
| 3rd Gear | 1.0000 |
| Min Input Speed (rpm) = | 2000.00 |
| Max Input Speed (rpm) = | 16000.00 |
| Input Speed Ratio = | 8.000 |

Table 1

FIG. 5

| Actual Geartrain | |
|---|---|
| Planetary 1 | |
| # Teeth on Ring = | 78 |
| # Teeth on Sun = | 30 |
| # Planets = | 4 |
| K = | 2.6000 |
| # Teeth on Planet = | 24 |
| Assembly Ratio = | 27 |
| Ring Factor = | 19.5 |
| Sun Factor = | 7.5 |
| 2nd Gear Coupled Planetary | |
| # Teeth on Ring = | 84 |
| # Teeth on Sun = | 52 |
| # Planets = | 4 |
| K = | 1.6154 |
| # Teeth on Planet = | 16 |
| Assembly Ratio = | 34 |
| Ring Factor = | 21 |
| Sun Factor = | 13 |

Table 2

FIG. 6

| Actual Gear Speeds | | | | | | | | | |
|---|---|---|---|---|---|---|---|---|---|
| Gear | Carrier Speed (rpm) | Sun / VFG Speed (-rpm) | Ring Speed (rpm) | Planet Speed (rpm) | 2nd Ring Speed (rpm) | 2nd Carrier Speed | 2nd Sun Speed (rpm) | 2nd Planet Speed (rpm) | Shift Zone (rpm) |
| 1st | 2000.0 | 7200.0 | 0.0 | -6500.0 | 2000.0 | 0.0 | -3230.8 | 10500.0 | |
|  | 4444.4 | 16000.0 | 0.0 | -14444.4 | 4444.4 | 0.0 | -7179.5 | 23333.3 | 833.8 |
| 2nd | 3610.8 | 7200.0 | 2230.1 | -4486.7 | 3610.8 | 2230.1 | 0.0 | 7247.8 | |
|  | 8023.6 | 16000.0 | 4955.8 | -9970.5 | 8023.6 | 4955.8 | 0.0 | 16106.2 | 823.6 |
| 3rd | 7200.0 | 7200.0 | 7200.0 | 0.0 | 7200.0 | 7200.0 | 7200.0 | 0.0 | |
|  | 16000.0 | 16000.0 | 16000.0 | 0.0 | 16000.0 | 16000.0 | 16000.0 | 0.0 | |

Table 3

FIG. 7

| Startup Speeds | | | | | | | | |
|---|---|---|---|---|---|---|---|---|
| Gear | Carrier Speed (rpm) | Sun / VFG Speed (-rpm) | Ring Speed (rpm) | Planet Speed (rpm) | 2nd Ring Speed (rpm) | 2nd Carrier Speed | 2nd Sun Speed (rpm) | 2nd Planet Speed (rpm) |
| 3rd | 0.0 | 0.0 | 0.0 | 0.0 | 0.0 | 0.0 | 0.0 | 0.0 |
|  | 1000.0 | 1000.0 | 1000.0 | 0.0 | 1000.0 | 1000.0 | 1000.0 | 0.0 |
| 2nd | 1000.0 | 1994.1 | 617.6 | -1242.6 | 1000.0 | 617.6 | 0.0 | 2007.4 |
|  | 1700.0 | 3390.0 | 1050.0 | -2112.5 | 1700.0 | 1050.0 | 0.0 | 3412.5 |
| 1st | 1700.0 | 6120.0 | 0.0 | -5525.0 | 1700.0 | 0.0 | -2746.2 | 8925.0 |
|  | 2000.0 | 7200.0 | 0.0 | -6500.0 | 2000.0 | 0.0 | -3230.8 | 10500.0 |

% Min Speed to Engage 1st Gear = 85.0%  
% Min Speed to Engage 2nd Gear = 50.0%

Table 4

FIG. 8

LOW SPEED SPOOL GENERATOR TRANSMISSION

BACKGROUND

1. Field

The present disclosure relates to turbomachines, more specifically to low speed spool generator transmissions.

2. Description of Related Art

Most modern turbomachines have multiple spools, e.g., low pressure and high pressure for example. Traditionally, the high pressure spool drives engine and aircraft accessories, however, progressive increases in reliance on the high pressure spool has reached the maximum point after which stall out at low RPM could be possible. The low pressure spool has not been used for accessories, e.g., a generator, for many reasons such as large speed range.

Such conventional methods and systems have generally been considered satisfactory for their intended purpose. However, there is still a need in the art for improved turbomachine systems. The present disclosure provides a solution for this need.

SUMMARY

A low speed spool multispeed transmission includes an input shaft configured to connect to a low pressure spool gearbox, a gear system connected to the input shaft and configured to convert an input speed of the input shaft to an output speed within a predetermined speed range, wherein the gear system includes a plurality of gear states to change the ratio between the input speed and the output speed, and an output shaft connected to the gear system to be rotated by the gear system at the output speed, the output shaft configured to connect to a generator.

In certain embodiments, the output shaft can extend in a same axial direction from the transmission as the input shaft. The input shaft and the output shaft can be coaxial.

The plurality of gear states can include three gear states. Any other suitable number of speeds is contemplated herein.

The gear system can include a first planetary gear including a first carrier operatively connected to a plurality of first planet gears, a first ring gear meshed with the first planet gears, and a first sun gear meshed with the first planet gears. In certain embodiments, the first sun gear can be connected to the output shaft such that the output shaft rotates at the same speed as the first sun gear.

The gear system can include a second bi-coupled planetary gear including a second carrier operatively connected to a plurality of second planet gears, a second ring gear meshed with the second planet gears, and a second sun gear meshed with a second planet gears. The second carrier can be connected to the first ring gear to rotate at the same speed as the first ring gear.

The second ring gear can be connected to the first carrier to rotate at the same speed as the first carrier. The gear system can include a first band brake configured to brake the first ring gear. The gear system can include a second band brake configured to brake the second sun gear. Any other suitable type of braking mechanism is contemplated herein.

The gear system can include an overrunning clutch configured to connect the first carrier to the first ring gear to cause the first ring gear and the first sun gear to rotate at the same speed as the first carrier. In certain embodiments, the gear system can include a second overrunning clutch configured to connect the second sun gear to the second band brake.

The transmission can be configured to maintain the output speed range within a 2.22:1 ratio when the input speed range varies as much as 8:1. Any other suitable range and/or ratio is contemplated herein.

A turbomachine generator system can include a low speed spool gear box, a low speed spool multispeed transmission as described above, and a generator connected to the output shaft of the multispeed transmission. The generator can be a variable frequency generator and the predetermined speed range is about 7200 RPM to about 16000 RPM. Any other suitable generator and/or predetermined speed range is contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
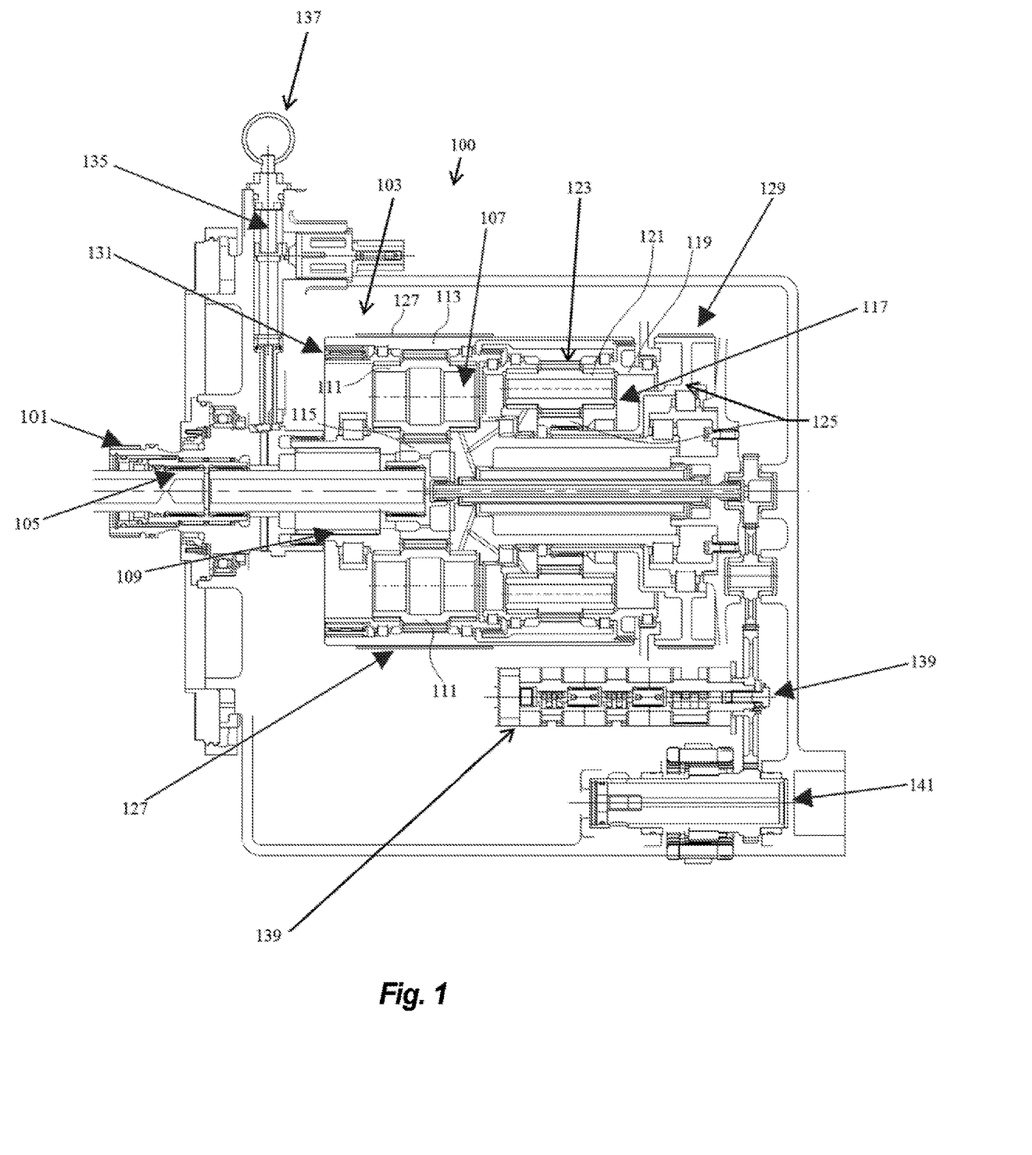
FIG. 1 is a cross-sectional view of an embodiment of a multispeed transmission in accordance with this disclosure.

Reference will now be made to the drawings wherein like reference numerals identify similar structural features or aspects of the subject disclosure. For purposes of explanation and illustration, and not limitation, an illustrative view of an embodiment of a transmission in accordance with the disclosure is shown in FIG. 1 and is designated generally by reference character 100. Other embodiments and/or aspects of this disclosure are shown in FIGS. 2-8. The systems and methods described herein can be used to utilize the low speed spool for use in driving accessories (e.g., a generator).

A low speed spool multispeed transmission 100 includes an input shaft 101 configured to connect to a low pressure spool gearbox. The transmission 100 includes a gear system 103 connected to the input shaft 101 and configured to convert an input speed of the input shaft 101 to an output speed within a predetermined speed range (e.g., about 7200 RPM to about 16000 RPM).

The gear system 103 includes a plurality of gear states to change the ratio between the input speed and the output speed. The gear system 103 also includes an output shaft 105 connected to the gear system 103 to be rotated by the gear system 103 at the output speed. The output shaft 105 can be configured to connect to a generator (e.g., a variable frequency generator) or any other suitable accessory. As shown, the input shaft 101 and the output shaft 105 can be coaxial.

In certain embodiments, the plurality of gear states can include three gear states (e.g., 1st gear, 2nd gear, and 3rd gear). Any other suitable number of speeds is contemplated herein.

The gear system 103 can include a first planetary gear 107 including a first carrier 109 operatively connected to a plurality of first planet gears 111, a first ring gear 113 meshed with the first planet gears 111, and a first sun gear 115 meshed with the first planet gears 111. In certain embodiments, the first sun gear 115 can be connected to the output shaft 105 such that the output shaft 105 rotates at the same speed as the first sun gear 115.

The gear system 103 can include a second bi-coupled planetary gear 117 including a second carrier 119 operatively connected to a plurality of second planet gears 121, a second ring gear 123 meshed with the second planet gears 121, and a second sun gear 125 meshed with a second planet gears 121. The second carrier 119 can be connected to the first ring gear 113 (e.g., via a spline) to rotate at the same speed as the first ring gear 113.

The second ring gear 123 can be connected to the first carrier 109 (e.g., via a spline) to rotate at the same speed as the first carrier 109. The gear system 103 can include a first band brake 127 configured to brake the first ring gear 113. The gear system 103 can include a second band brake 129 configured to brake the second sun gear 125. Any other suitable type of braking mechanism is contemplated herein.

In certain embodiments, the transmission 100 can include a release device 135 for bypassing the gear system 103 (e.g., in the event of failure). The release device can be a pilot actuated solenoid, for example, and can include a pull ring 137 for resetting after actuation.

In certain embodiments, the transmission 100 can include one or more accessory pumps 139 (e.g., for pumping oils and/or hydraulic fluids for the gear system 103, a gearbox, or any other suitable system). Any suitable amount of pumps 139 are contemplated herein.

In certain embodiments, the transmission 100 can include a controller. The controller can include any suitable hardware and/or software for operating any suitable components (e.g., the release device, band brakes, and/or clutches) of the gear system 103.

In certain embodiments, the transmission 100 can include an oil separator/permanent magnet generator (PMG) 141, e.g., to separate air from oil and/or for powering the controller. In certain embodiments, the PMG 141 can be used as speed sensor and can be connected to the controller. The pumps 139 and/or the separator/PMG 141 can be connected to the gear system 103 in any suitable manner to be driven by the gear system 103 at any suitable speed(s).

The gear system 103 can include an overrunning clutch 131 configured to connect the first carrier 109 to the first ring gear 113 to cause the first ring gear 113 and the first sun gear 115 to rotate at the same speed as the first carrier 109. Accordingly, the overrunning clutch 131 can limits speed ratio to 1:1 if neither band brake is engaged.

Figure 2:
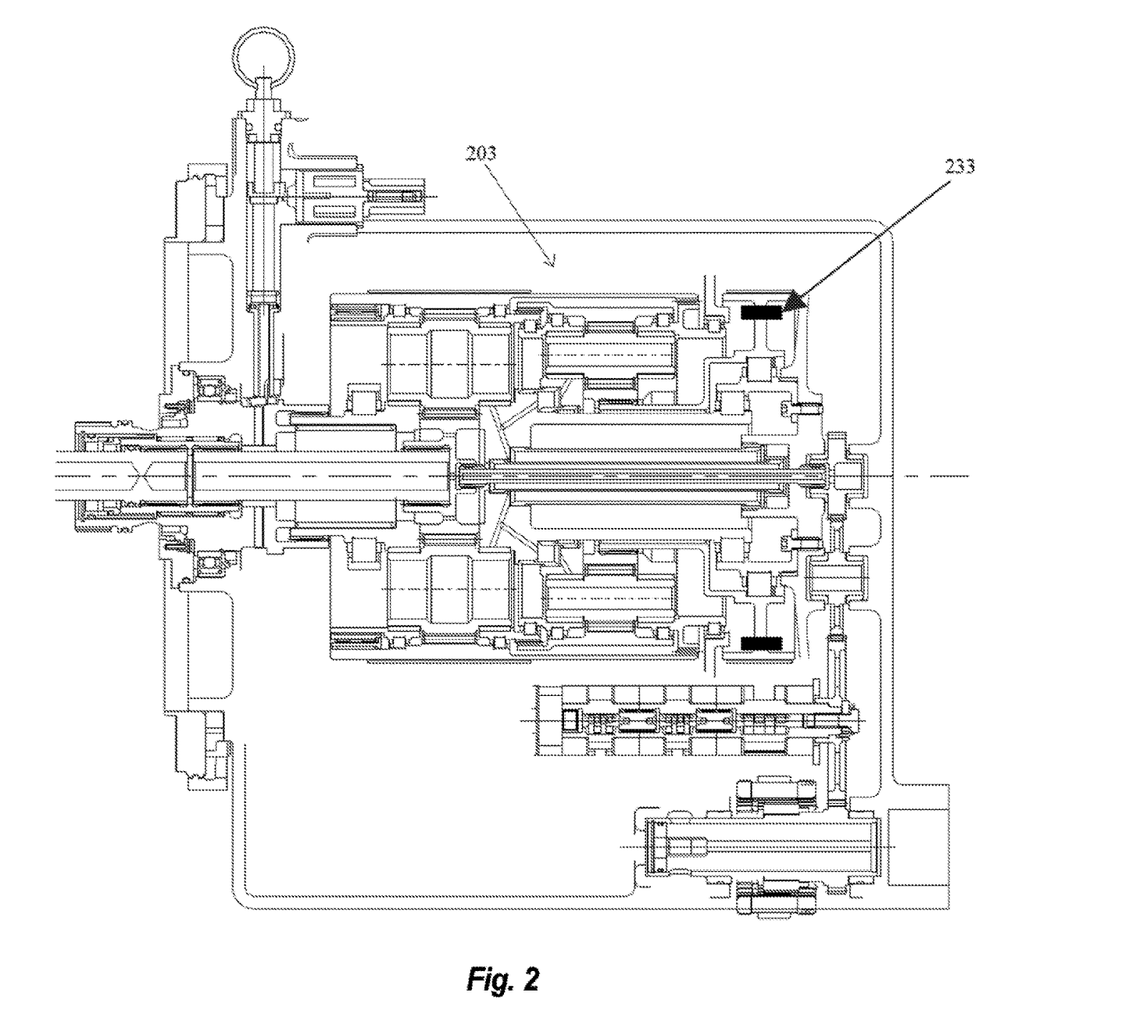
FIG. 2 is a cross-sectional view of another embodiment of a multispeed transmission in accordance with this disclosure.

Referring to FIG. 2, in certain embodiments, a gear system 203 can include a second overrunning clutch 233 configured to connect the second sun gear 125 to the second band brake 129. In certain embodiments, the second overrunning clutch 233 can be useful if timing of releasing the first band brake 127 and engagement of the second band brake 129 is inaccurate such that both band brakes can be engaged together in first gear and the first band brake 127 can be released in second gear with engagement of the second overrunning clutch 233.

Figure 3:
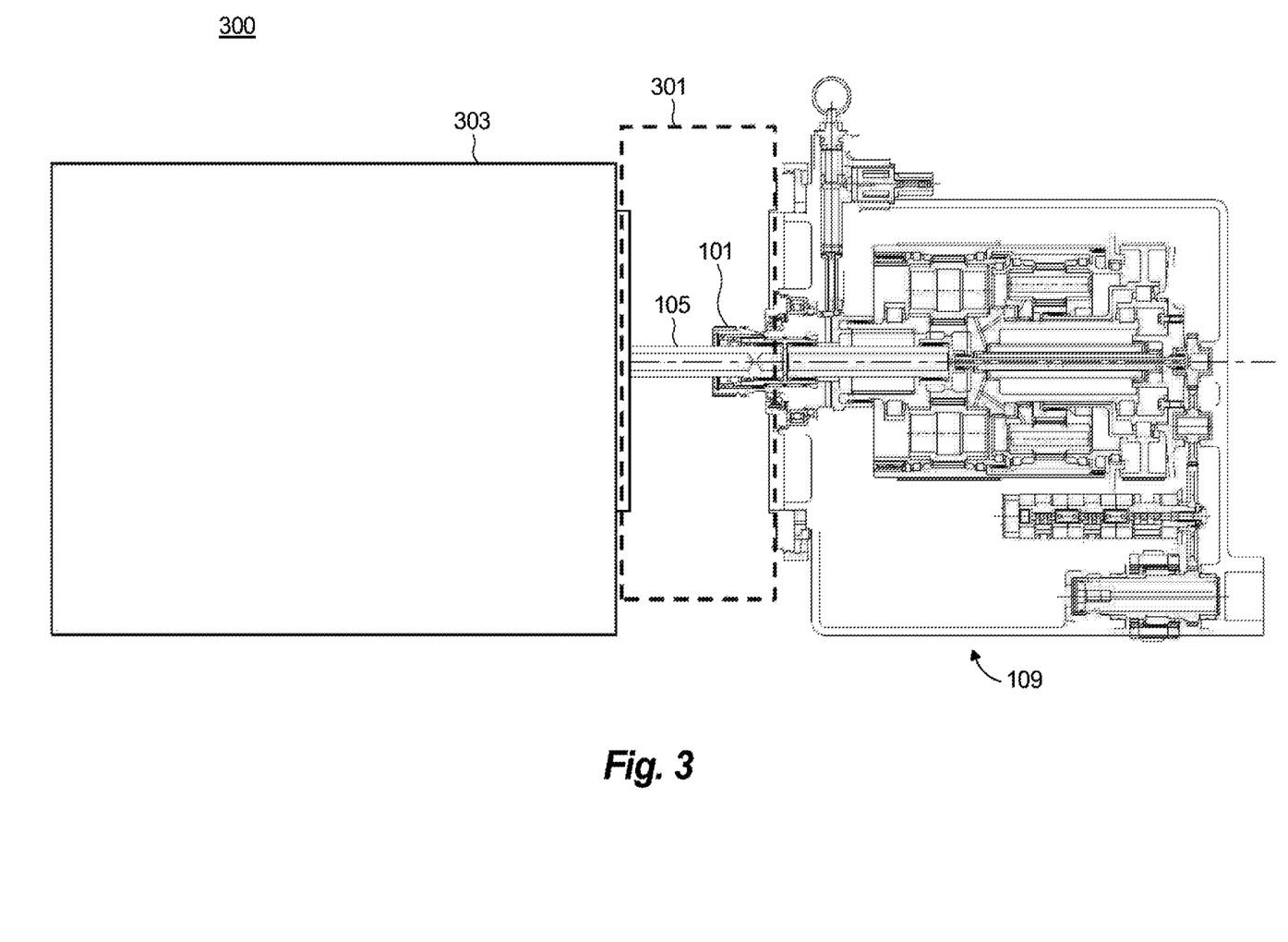
FIG. 3 is a schematic view of an embodiment of a system in accordance with this disclosure.

Referring to FIG. 3, a turbomachine generator system 300 can include a low speed spool gear box 301, a low speed spool multispeed transmission (e.g., transmission 100 or any other suitable embodiments as described above), and a generator 303 connected to the output shaft 105 of the multispeed transmission 100. The generator 303 can be a variable frequency generator (VFG) or any other suitable generator or accessory. In certain embodiments, (e.g., for a 6-pole VFG), the predetermined speed range can be about 7200 RPM to about 16000 RPM. Any other suitable generator and/or predetermined speed range is contemplated herein.

In accordance with at least one aspect of this disclosure, as shown in FIG. 1, a 1st gear can be achieved by engaging only the first band brake 127. A 2nd gear can be achieved by releasing the first band brake 127 while engaging the second band brake 129. A 3rd gear can be achieve by engaging only the first overrunning clutch.

Figure 5:
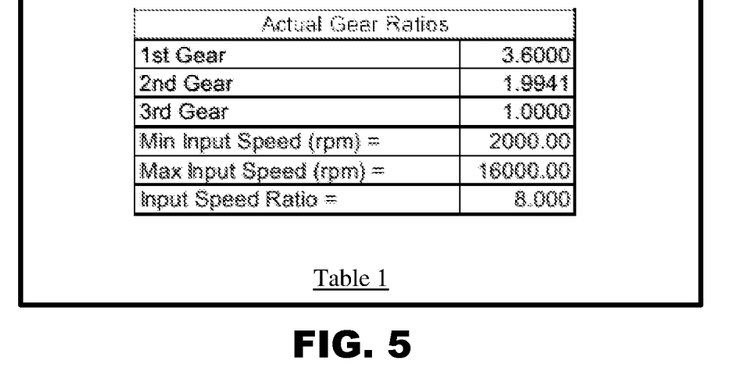
FIG. 5 is a chart of an embodiment of gear ratios in accordance with this disclosure.
Figure 6:
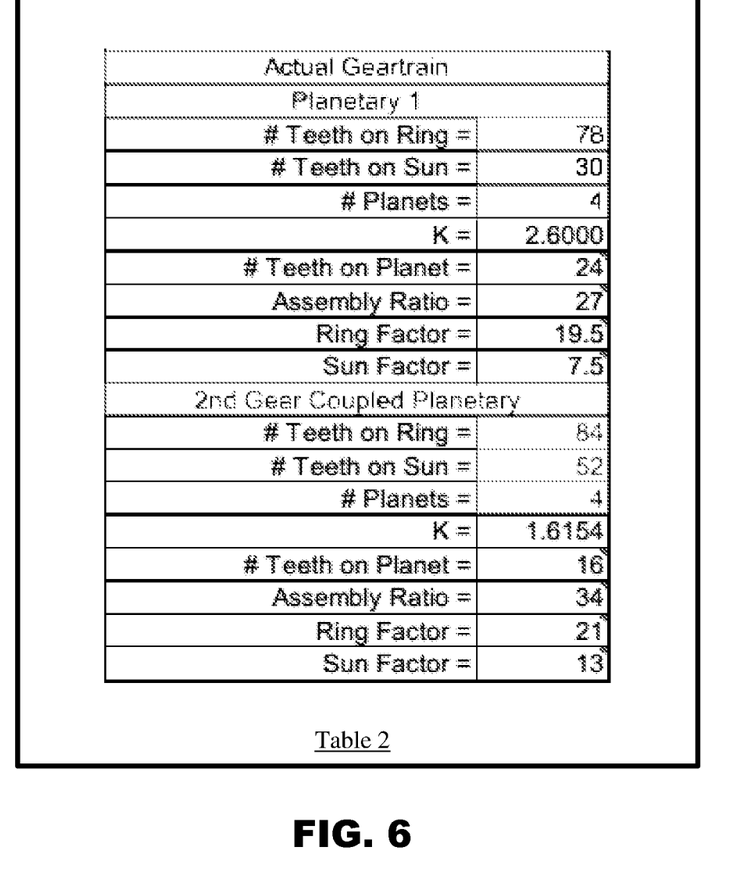
FIG. 6 is a chart of an embodiment of gear train characteristics in accordance with this disclosure.
Figure 7:
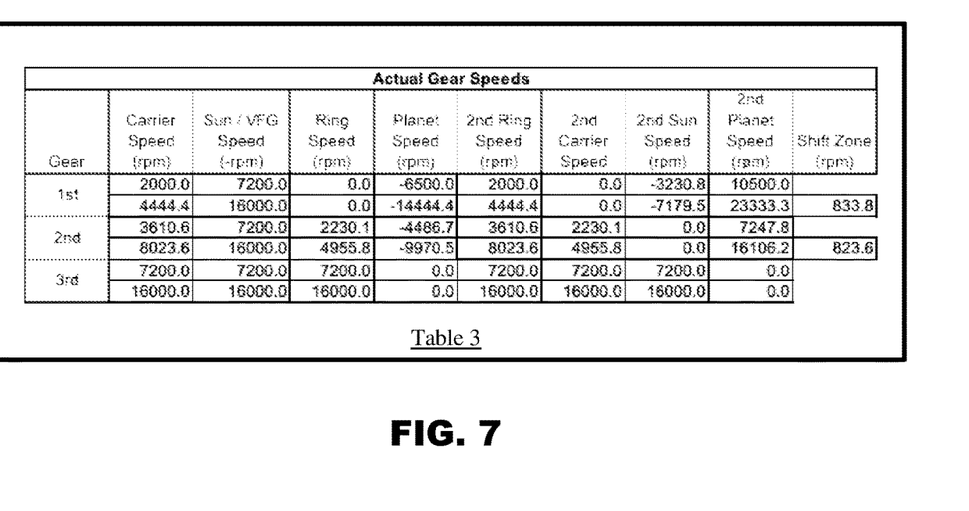
FIG. 7 is a chart of an embodiment of actual gear speeds of each gear in a gear system in each gear state in accordance with this disclosure.
Figure 8:
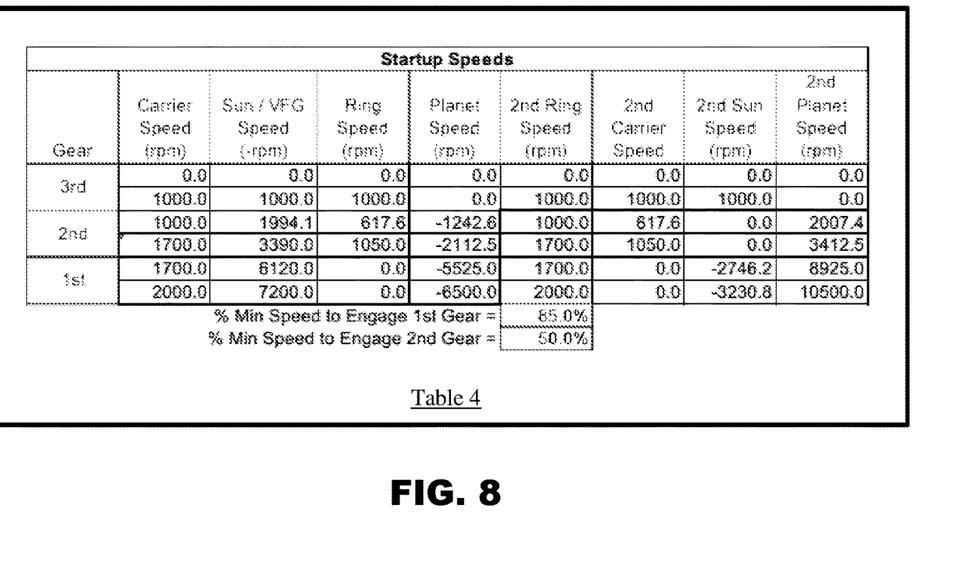
FIG. 8 is a chart of an embodiment of start-up gear speeds of each gear in a gear system in each gear state in accordance with this disclosure.

FIG. 5 shows an embodiment of gear ratios. FIG. 6 shows an embodiment of gear train characteristics. FIG. 7 shows an embodiment of actual gear speeds of each gear in the gear system 103 in each gear state. FIG. 8 shows an embodiment of start-up gear speeds of each gear in the gear system in each gear state.

Figure 4:
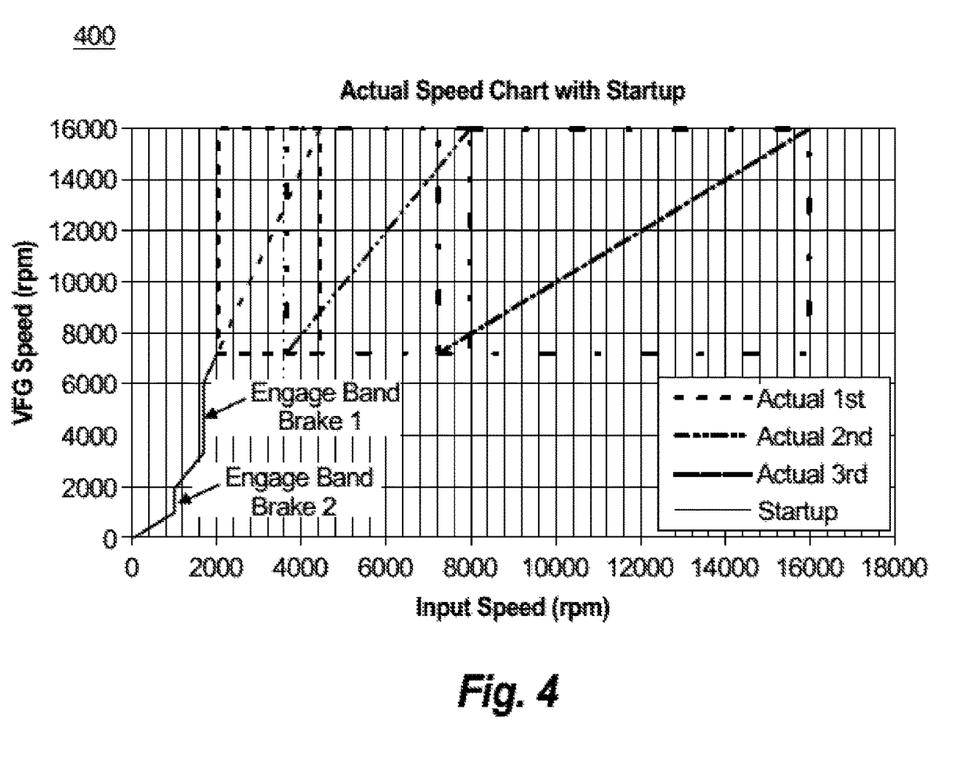
FIG. 4 is a chart of input speed vs. output speed in accordance with an embodiment of this disclosure

FIG. 4 shows a chart 400 of input speeds versus output speed in the various gears. The chart 400 also shows start up shifts and embodiments of shift ranges shown in phantom.

Embodiments include a three speed transmission design with coaxial input and output for driving a 6-pole Variable Frequency Generator (VFG). Embodiments can are compact and allow a generator to be driven across an 8:1 input speed range (e.g., which can be a typical high bypass turbofan low pressure spool operating speed range). Selective control of the gears allows for maintaining a suitable generator output frequency (e.g., 360-800 Hz) across a wide input speed range by outputting a narrow speed range for driving accessories, e.g., VFGs.

The methods and systems of the present disclosure, as described above and shown in the drawings, provide for gear systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A low speed spool multispeed transmission, comprising:
   an input shaft configured to connect to a low pressure spool gearbox;
   a gear system connected to the input shaft and configured to convert an input speed of the input shaft to an output speed within a predetermined speed range, wherein the gear system includes a plurality of gear states to change a ratio between the input speed and the output speed, wherein the gear system includes:
   a first planetary gear including a first carrier operatively connected to a plurality of first planet gears;
   a first ring gear meshed with the first planet gears;

a first sun gear meshed with the first planet gears;
a second bi-coupled planetary gear including a second carrier operatively connected to a plurality of second planet gears;
a second ring gear meshed with the second planet gears; and
a second sun gear meshed with a second planet gears, wherein the second carrier is connected to the first ring gear to rotate at the same speed as the first ring gear; and
an output shaft connected to the gear system to be rotated by the gear system at the output speed, the output shaft configured to connect to a generator, wherein the first sun gear is connected to the output shaft such that the output shaft rotates at the same speed as the first sun gear.

2. The transmission of claim 1, wherein the output shaft extends in a same axial direction from the transmission as the input shaft.

3. The transmission of claim 2, wherein the input shaft and the output shaft are coaxial.

4. The transmission of claim 1, wherein the plurality of gear states include a 1st gear, a 2nd gear, and a 3rd gear.

5. The transmission of claim 1, wherein the second ring gear is connected to the first carrier to rotate at the same speed as the first carrier.

6. The transmission of claim 5, wherein the gear system includes a first band brake configured to brake the first ring gear.

7. The transmission of claim 6, wherein the gear system includes a second band brake configured to brake the second sun gear.

8. The transmission of claim 7, wherein the gear system includes an overrunning clutch configured to connect the first carrier to the first ring gear to cause the first ring gear and the first sun gear to rotate at the same speed as the first carrier.

9. The transmission of claim 8, further comprising a second overrunning clutch configured to connect the second sun gear to the second band brake.

10. The transmission of claim 1, wherein the transmission is configured to maintain the output speed range within a 2.22:1 ratio when the input speed range varies as much as 8:1.

11. A turbomachine generator system, comprising:
a low speed spool gear box;
a low speed spool multispeed transmission, including:
an input shaft configured to connect to a low pressure spool gearbox;
a gear system connected to the input shaft and configured to convert an input speed of the input shaft to an output speed within a predetermined speed range, wherein the gear system includes a plurality of gear states to change the ratio between the input speed and the output speed, wherein the gear system includes:
a first planetary gear including a first carrier operatively connected to a plurality of first planet gears;
a first ring gear meshed with the first planet gears;
a first sun gear meshed with the first planet gears;
a second bi-coupled planetary gear including a second carrier operatively connected to a plurality of second planet gears;
a second ring gear meshed with the second planet gears; and
a second sun gear meshed with a second planet gears, wherein the second carrier is connected to the first ring gear to rotate at the same speed as the first ring gear; and
an output shaft connected to the gear system to be rotated by the gear system at the output speed, the output shaft configured to connect to a generator, wherein the first sun gear is connected to the output shaft such that the output shaft rotates at the same speed as the first sun gear; and
a generator connected to the output shaft of the multispeed transmission.

12. The system of claim 11, wherein the generator is a variable frequency generator and the predetermined speed range is about 7200 RPM to about 16000 RPM.

13. The system of claim 11, wherein the input shaft and the output shaft are coaxial.

14. The system of claim 11, wherein the plurality of gear states include three gear states.

* * * * *